US008082473B2

(12) United States Patent
Hall

(10) Patent No.: US 8,082,473 B2
(45) Date of Patent: Dec. 20, 2011

(54) ERROR HANDLING SCHEME FOR TIME-CRITICAL PROCESSING ENVIRONMENTS

(75) Inventor: Christopher J Hall, Boston, MA (US)

(73) Assignee: Presagis, Montreal, Quebec (CA)

( * ) Notice: Subject to any disclaimer, the term of this patent is extended or adjusted under 35 U.S.C. 154(b) by 0 days.

(21) Appl. No.: 12/202,168

(22) Filed: Aug. 29, 2008

(65) Prior Publication Data
US 2009/0132850 A1 May 21, 2009

Related U.S. Application Data

(63) Continuation of application No. 10/827,158, filed on Apr. 19, 2004, now Pat. No. 7,434,110.

(51) Int. Cl.
*G09F 11/00* (2006.01)
(52) U.S. Cl. .............. 714/48; 714/57; 719/323
(58) Field of Classification Search .............. 714/38, 714/48, 3, 57; 719/323, 324, 327, 322; 710/262
See application file for complete search history.

(56) References Cited

U.S. PATENT DOCUMENTS

| | | | | | |
|---|---|---|---|---|---|
| 5,269,021 | A | * | 12/1993 | Denio et al. | 719/323 |
| 5,687,376 | A | * | 11/1997 | Celi et al. | 717/127 |
| 5,778,226 | A | * | 7/1998 | Adams et al. | 719/311 |
| 5,862,362 | A | * | 1/1999 | Somasegar et al. | 703/21 |
| 5,862,388 | A | * | 1/1999 | Danneels et al. | 710/260 |
| 5,909,576 | A | * | 6/1999 | Fulk | 719/321 |
| 5,991,822 | A | * | 11/1999 | Mealey et al. | 719/327 |
| 6,553,429 | B1 | * | 4/2003 | Wentz et al. | 719/330 |
| 6,594,709 | B1 | * | 7/2003 | Agasaveeran et al. | 719/321 |
| 6,728,963 | B1 | * | 4/2004 | Forin et al. | 719/310 |
| 6,859,928 | B2 | * | 2/2005 | Wright | 718/102 |
| 6,871,350 | B2 | * | 3/2005 | Wong et al. | 719/323 |
| 6,886,112 | B2 | * | 4/2005 | Smith | 714/38 |
| 6,983,463 | B1 | * | 1/2006 | Hunt | 719/316 |
| 6,996,802 | B2 | * | 2/2006 | de Jong | 717/107 |
| 7,047,537 | B1 | * | 5/2006 | Stern | 719/331 |
| 7,069,205 | B1 | * | 6/2006 | Carroll et al. | 703/24 |
| 7,114,104 | B1 | * | 9/2006 | Bennett | 714/38 |
| 7,673,174 | B2 | * | 3/2010 | Swift et al. | 714/15 |
| 2001/0004746 | A1 | * | 6/2001 | Wright | 709/314 |
| 2003/0037291 | A1 | * | 2/2003 | Goldsmith et al. | 714/38 |
| 2003/0088712 | A1 | * | 5/2003 | Schultz | 709/321 |
| 2004/0003312 | A1 | * | 1/2004 | Smith | 714/5 |
| 2004/0181796 | A1 | * | 9/2004 | Fedotov et al. | 719/323 |
| 2007/0276968 | A1 | * | 11/2007 | Koerner et al. | 710/18 |

* cited by examiner

*Primary Examiner* — Robert Beausoliel
*Assistant Examiner* — Elmira Mehrmanesh
(74) *Attorney, Agent, or Firm* — FSP LLC

(57) ABSTRACT

As a result of detecting an error, command routing logic for device driver logic is reconfigured so that command processing logic of the device driver is not invoked and to return from commands in a manner indicative of successful completion of command processing.

2 Claims, 8 Drawing Sheets

ERROR HANDLING SCHEME FOR TIME-CRITICAL PROCESSING ENVIRONMENTS

PRIORITY CLAIM

The present application claims priority as a continuation under 35 USC 120 AND/OR 365 to U.S. application Ser. No. 10/827,158 filed on Monday, Apr. 19, 2004, which is presently co-pending.

TECHNICAL FIELD

The present disclosure relates to error handling in time-critical and/or time-bounded processing environments.

BACKGROUND

In time-critical processing environments, it is important to add predictability to the error compensation process. This is especially important in situations where the processing time may affect the safety of people and/or equipment, such as applications involving vehicular displays and controls. For example, in applications involving the update and display of information on an aircraft, it is crucial that errors that affect the accuracy and integrity of the display are compensated for quickly and predictably.

One approach to this challenge is to provide frequent feedback between logic layers of the processing environment. For example, a graphics display application may frequently interact with a graphics display driver, which may in turn frequently interact with a graphics subsystem. Each or most interactions of the graphics application with the graphics driver may involve the return of error and/or status information to the graphics application. If an error occurs in the graphics subsystem or graphics driver, the graphics application quickly gains notice of this situation and may adjust its behavior, or the behavior of the system it controls, accordingly. A problem with this approach is that returning error and status information for each or most interactions between logical layers of a processing system may degrade performance.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
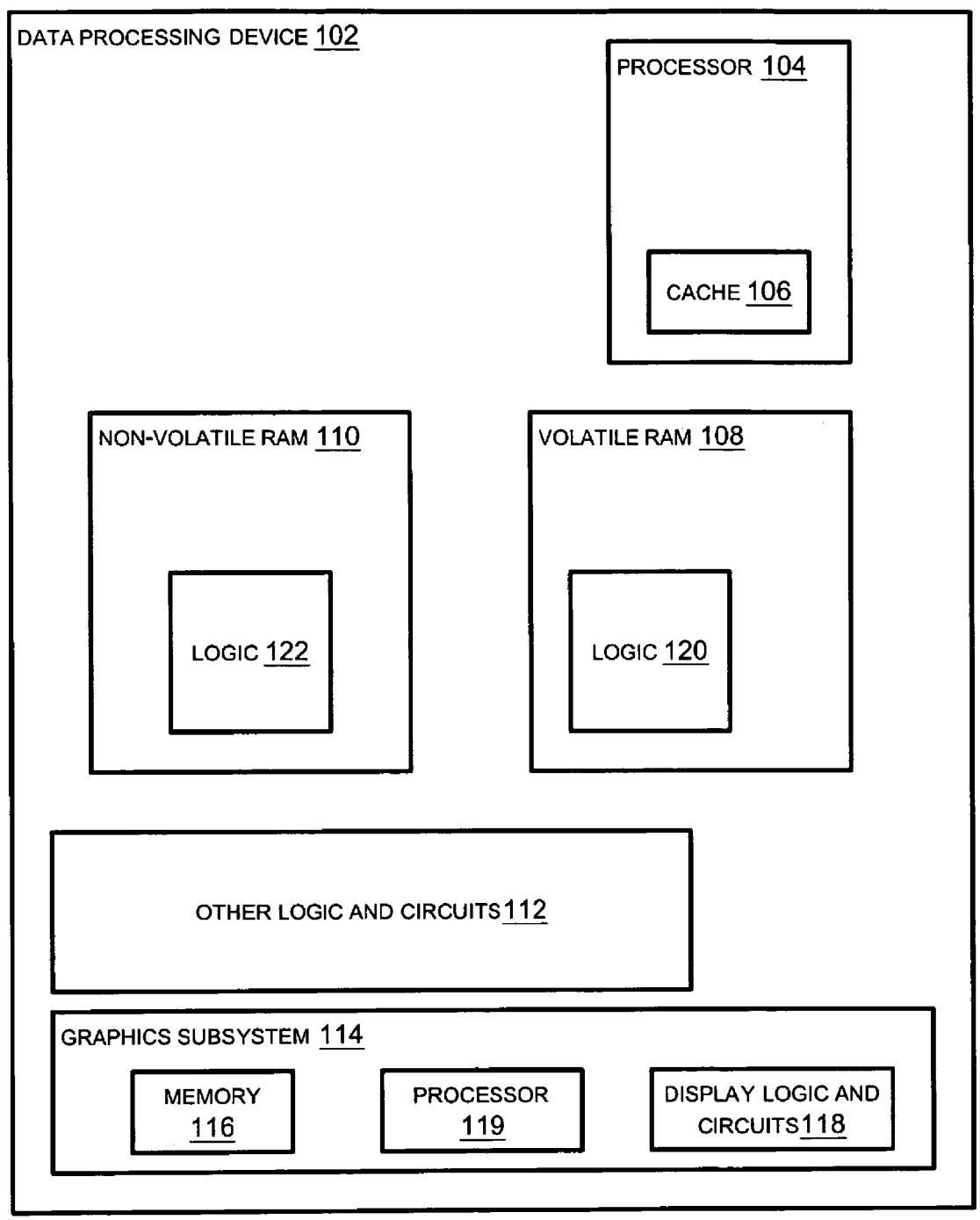
FIG. 1 is a block diagram of an embodiment of a data processing arrangement.

FIG. 1 is a block diagram of an embodiment of a data processing arrangement. A data processing device 102 (such as a vehicular display system) comprises a processor 104 and various types of memory. The types of memory may include a processor cache 106, volatile random access memory (RAM) 108, and non-volatile RAM 110 (read-only memory, magnetic and optical discs or other media, flash memory, and so on). The data processing device 102 may also comprise other logic and circuits 112 to perform processing that is not central to the present discussion.

The data processing device 102 comprises a graphics subsystem 114 that includes memory 116, display logic and circuits 118, and a graphics processor 119, among other things.

The volatile RAM 108 may comprise logic 120 that, when applied to the processor, results in collection, configuration, and display of graphics information. At any particular time, portions/versions 122 of the logic 120 may be comprised by non-volatile RAM 110. Likewise, the cache 106 may at times comprise portions/versions of the logic 120.

Graphics information may be provided to and stored by the memory 116 of the graphics subsystem 114. The graphics information may be configured such that applying the graphics information to the display and logic circuits 118 results in a visually informative graphical display. Both the processor 104 and the graphics processor 119 may provide configuration of the graphics information. For example, the logic 120 may influence the processor 104 to invoke the graphics processor 119 to perform graphics configuration operations.

The data processing device 102 may be a system of devices including multiple sensors, processors, displays, graphics subsystems, and other circuits and devices.

Figure 2:
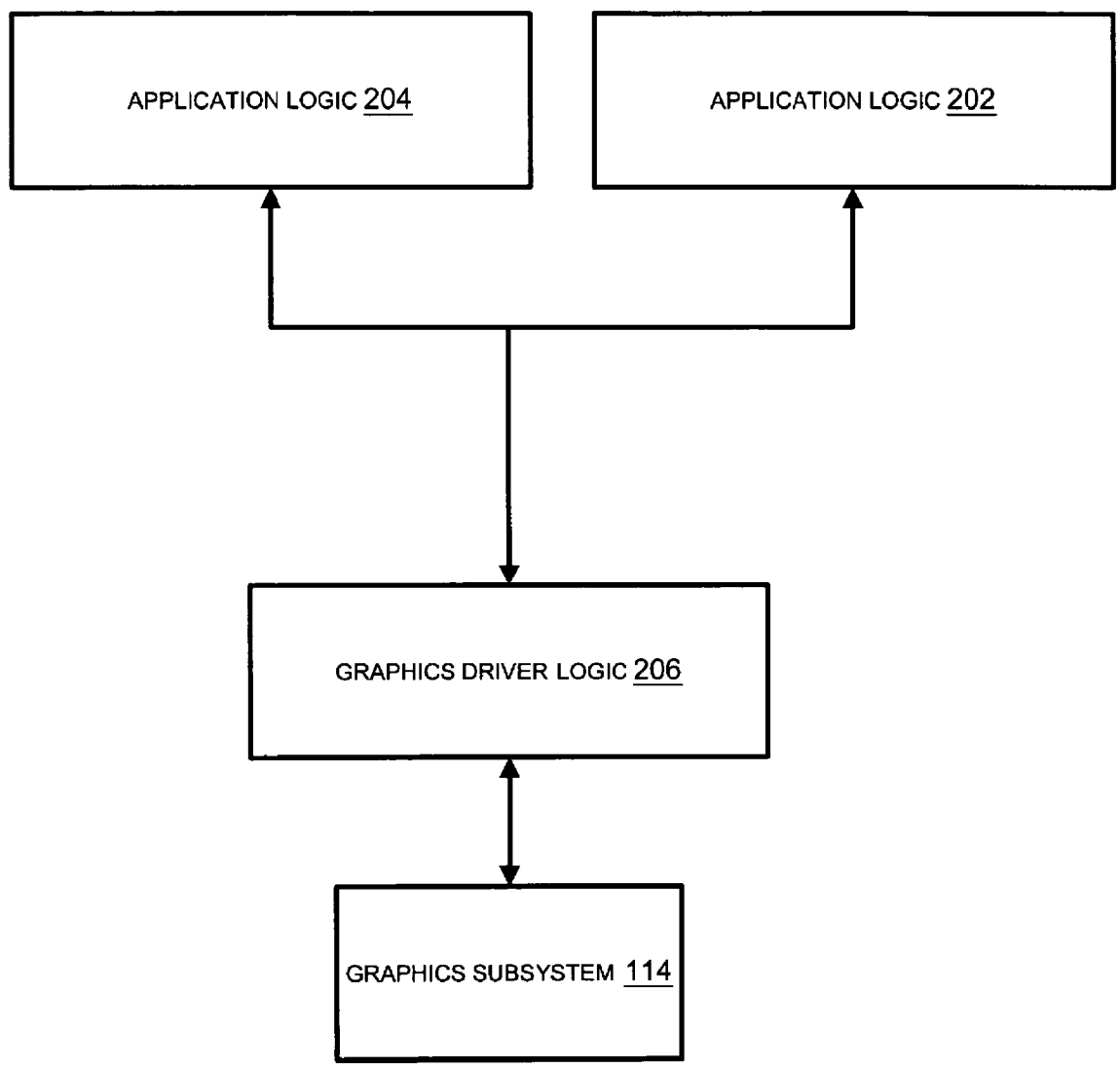
FIG. 2 is a block diagram of an embodiment of a graphics processing hierarchy.

FIG. 2 is a block diagram of an embodiment of a graphics processing hierarchy. Application logic 202 communicates with graphics driver logic 206. The graphics driver logic 206 communicates with the graphics subsystem 114 to configure graphics memory 116 and/or cause the graphics processor 119 to configure the graphics memory 116. Application logic 204 also communicates with graphics driver logic 206. In other words, multiple applications may communicate with and utilize a single graphics driver. The application logic 202, 204 is any logic that invokes the graphics driver logic 206, e.g. that causes the graphics driver logic 206 to be applied to affect the data processing device 102. Often, the application logic 202, 204 operates at a lower privilege level than the graphics driver logic 206. That is, the application logic 202, 204 may not affect certain operations, such operations of the graphics subsystem 114, that may be carried out by the graphics driver logic 206.

Typically, the application logic 202,204 invokes "high level" graphics operations of the graphics driver logic 206. Examples of high-level graphics operations include "draw line", "fill region", "draw polygon", and so on. In real-time display systems, the application logic 202, 204 may invoke graphics operations to configure and display a "frame" of graphics information, that is, a periodic (often 30-60 Hz) replacement or update of all or a portion of the graphics information presently displayed. Interruptions and/or errors in the periodic update and display of frames may result in the display of erroneous, distorted, and/or out of date information, or "blackout" periods where no information is displayed. This is a serious concern in vehicular display and control environments.

The graphics driver logic 206 invokes "low level" graphics operations of the graphics subsystem 114 to carry out the high level operations of the application logic 202, 204. The graphics driver logic 206 thus simplifies the design of the application logic 202, 204 by enabling high level graphics operations and by managing communication to the graphics subsystem 114 from multiple applications 202, 204.

Processing and operational errors in the graphics subsystem 114 may be communicated to or detected by the graphics driver logic 206 at or near the time that the errors occur. However, in high-performance environments it may be inefficient to communicate errors to the application logic 202, 204 at or near the time that the errors occur, due in part to the fact that there may be many applications in process, and also due to other factors. For similar reasons it may be inefficient for the application logic 202, 204 to attempt to detect errors in the graphics subsystem 114 at or near the time that the errors occur. Thus, the application logic 202, 204 may continue to invoke the graphics driver logic 206 for a significant interval of time after an error condition has arisen, leading to inefficient processing that can degrade system performance. For example, an error may occur early in the configuration of a frame, but the application logic 202, 204 may not detect the error until it has attempted to configure the entire frame by continuing to invoke the graphics driver logic 206. This may leave little time to recover from the error (for example, by reconfiguring the frame or switching to a backup display scheme) before the frame is due for display.

Figure 3:
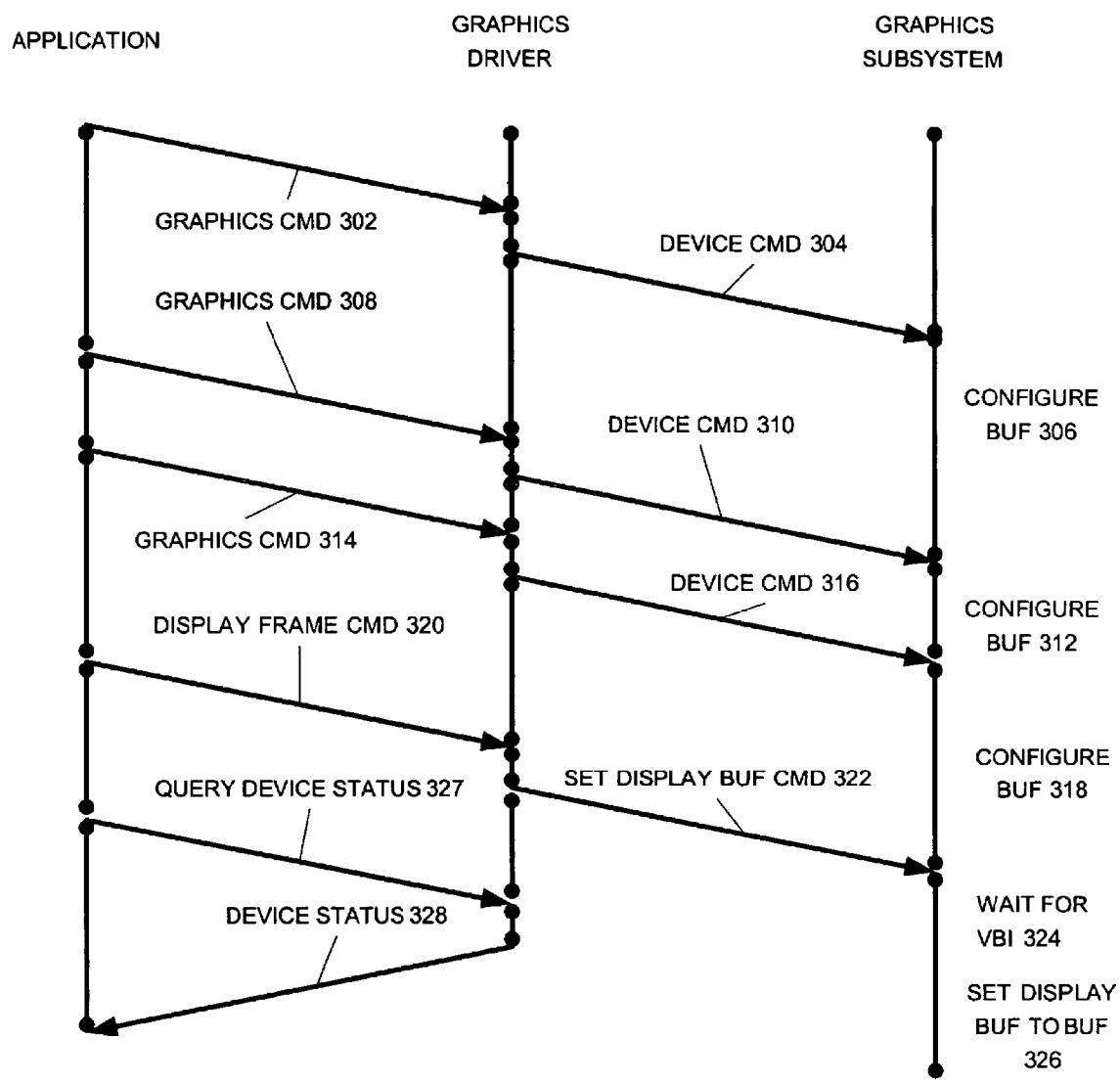
FIG. 3 is an action diagram of an embodiment of a graphics processing scheme.

FIG. 3 is an action diagram of an embodiment of a graphics processing scheme. At 302 application logic invokes processing by the graphics driver logic. The invocation may take the form of a "command", e.g. directing the processor 104 to an instruction of the graphics control logic associated with particular processing. For example, a "fill" command by the application logic may direct the processor 104 to the first instruction of the graphics driver logic that is involved with causing the graphics subsystem 114 to fill a region of the display. In some embodiments a command may take the form of a "function call", "procedure call", or other form of call.

At 304 the graphics driver provides a device command (typically a low level graphics command) to the graphics subsystem. Often, a single high level command from the application results in multiple low level commands from the driver to the graphics subsystem. At 306 the graphics subsystem configures a buffer according to the device command from the graphics driver. The contents of the buffer may affect the operation of the display logic and circuits 118 (e.g. the buffer is the current "display buffer"). Often, in frame-based processing environments, the buffer is a region of the graphics memory 116 that may affect the operation of the display logic and circuits 118, but only after a change to the configuration of the graphics subsystem 114 (e.g. the buffer is an "off-screen" or "swap" buffer). Affecting this change to cause the buffer to become the display buffer is referred to as a "screen swap" or "buffer swap".

At 308 the application provides another graphics command to the graphics driver, and at 310 the graphics driver provides (one or more) device commands to the graphics subsystem in response. At 312 the graphics subsystem configures the buffer accordingly. This process repeats for a third graphics command at 314, 316, and 318.

At 320 the application provides a display frame command to the graphics driver, which at 322 provides set display (swap) buffer command to the graphics subsystem. At 324 the graphics subsystem waits for the next appropriate interval to display the frame, which is often the next vertical blanking interval (VBI). At 326 the graphics subsystem sets the display buffer to the buffer, resulting in display of the frame configured by the application.

At 327 the application provides a command to query the status of the graphics subsystem and graphics driver. At 328 the graphics driver provides device status to the application. At this time the application may detect any errors that occurred during configuration of the frame.

Figure 4:
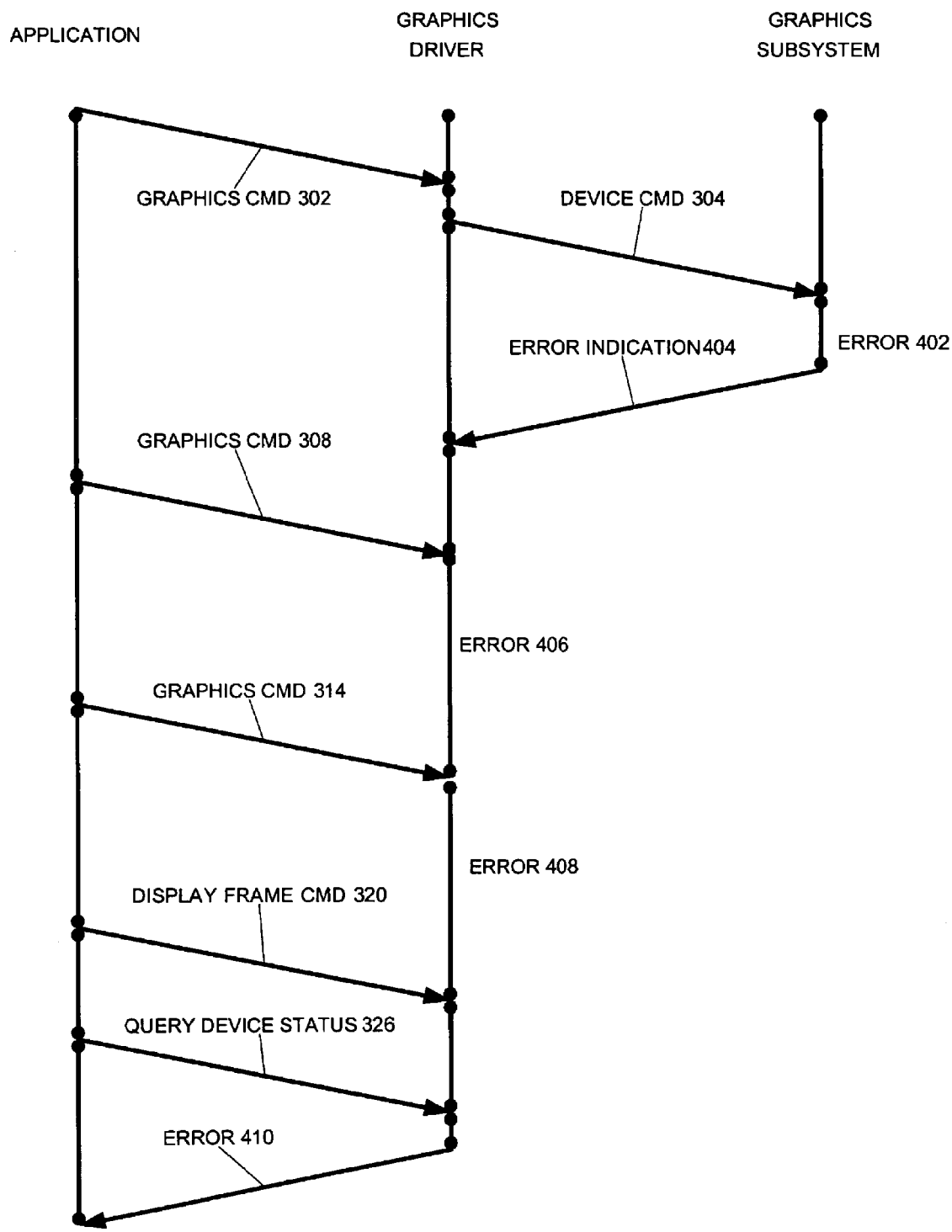
FIG. 4 is an action diagram of an embodiment of error handling for a graphics processing scheme.

FIG. 4 is an action diagram of an embodiment of error handling for a graphics processing scheme. A device command provided at 304 from the graphics driver to the graphics subsystem results in an error at 402. At 404 the graphics subsystem provides an error indication to the graphics driver. The error situation is not communicated to the application, e.g. the invocation to the driver does not include a mechanism for returning a result of the driver's operations to the application. Thus, at 308 the application provides another graphics command to the graphics driver. At 406 the graphics driver detects the error situation that occurred previously, and thus does not invoke the graphics subsystem. At 314 the application provides another graphics command to the graphics driver, and once again, at 408, the graphics driver detects the error situation. Thus, the graphics driver continues to receive graphics commands from one or more applications, and repeatedly is called upon to detect the prior error situation and operate accordingly (e.g. by not invoking the graphics subsystem).

At 320 the application provides a display frame command to the graphics driver, and at 326 the application provides a query device status command to the graphics driver. At 410 the graphics driver provides an error indication to the application. The application may then proceed to attempt to recover the frame and/or perform other recovery operations. However, valuable processing time has been consumed by the. repeated invocations to the graphics driver, where the graphics driver repeatedly detected the error condition and operated accordingly.

Figure 5:
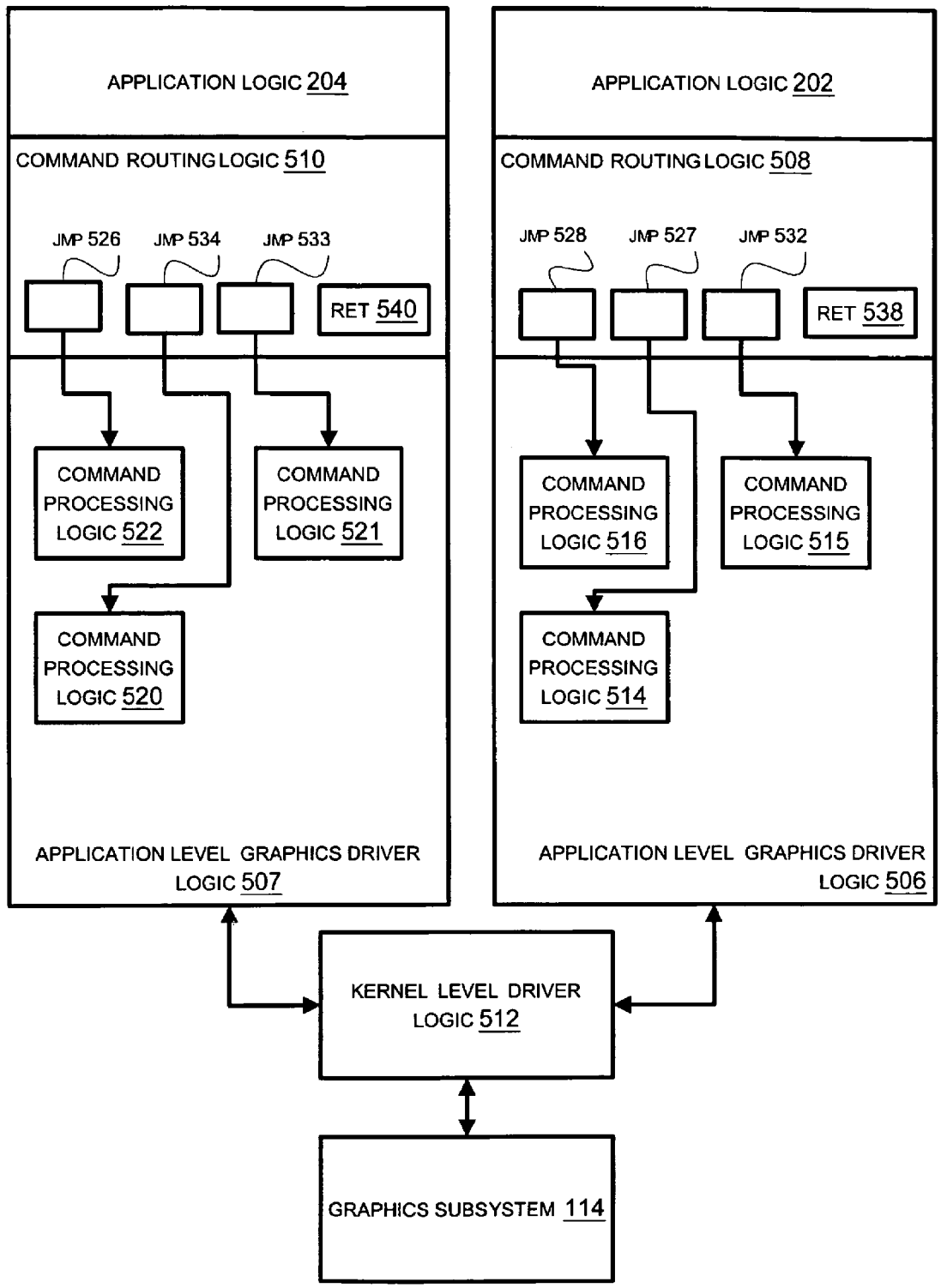
FIG. 5 is a block diagram of an embodiment of a logical arrangement for a graphics processing scheme.

FIG. 5 is a block diagram of an embodiment of a logical arrangement for a graphics processing scheme. The graphics driver logic 206 comprises first application level graphics driver logic 506 and kernel driver logic 512. The application level graphics driver logic 506 executes at a same privilege level as the application logic and may execute as library code linked statically and/or dynamically with first application logic 202. The kernel driver logic 512 executes at a higher privilege level than the application level graphics driver logic 506 and may more directly affect the operation of the graphics subsystem 114. Second application logic 204, substantially similar to the first application level graphics driver logic 506, may be linked with application level graphics driver logic 507. In other words, multiple applications may link with multiple instances of the application level graphics driver logic, each of which communicates with the graphics subsystem 114 via the kernel driver logic 512.

The first application level graphics driver logic 506 comprises command processing logic elements 515, 514, and 516. Command processing logic elements 514, 515, 516 may be invoked in response to a graphics commands from the application logic 202. For example, a first graphics command from the application logic 202 to draw a line may invoke command processing logic 515. A second graphics command to draw a circle may invoke command processing logic 516. A third graphics command to fill a region may invoke command processing logic 514.

The second application level graphics driver logic 507 comprises command processing logic elements 520, 521, and 522 to process commands from the second application logic 204 in a substantially similar fashion as command processing logic elements 514-516 process commands from the first application logic 202. Each application level graphics driver logic 506, 507 may comprise additional command processing logic elements, and command processing logic elements may comprise logic in common.

Command routing logic 508 routes commands from the application 202 to the appropriate command processing logic element 514-516. In other words, commands from the application 202 invoke the command routing logic 508, which invokes the appropriate command processing logic element 514-516 of the application level graphics driver logic 506 to carry out the command. The command routing logic 508 comprises jump logic 527, 528, and 532 to invoke the command processing logic element 514-516 corresponding to a command from the application logic 202. In other words, in one embodiment the command routing logic 508 comprises a jump table with entries providing a correspondence between commands from the application 202 and command processing logic elements of the application level graphics driver logic 506. The jump table may also be referred to as a thunk layer. The command routing logic 508 further comprises return logic 538 to cause a command from the application 202 to return without performing substantial processing and without providing the application 202 with an indication that the command was not processed and/or resulted in an error condition. In other words, the routing logic 508 "stubs out" the processing of the application level graphics driver logic 506. The purpose and operation of the return logic 538 is described more fully in conjunction with FIG. 7.

Command routing logic 510 comprises jump logic 526, 533, and 534, and return logic 540, to perform routing operations for command of application logic 204 similar to those routing operations performed by command routing logic 508 for application logic 202.

Figure 6:
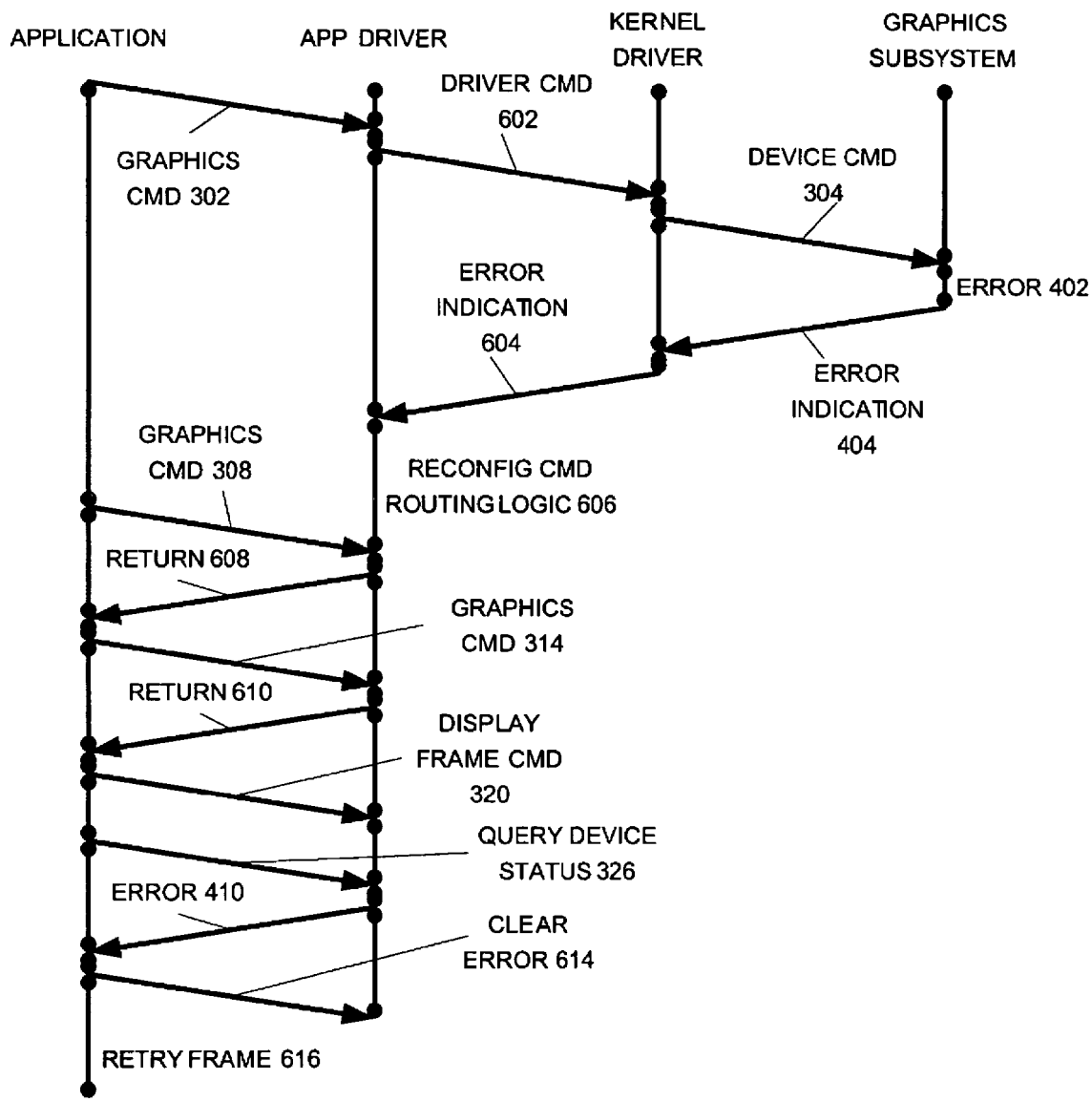
FIG. 6 is an action diagram of an embodiment of error handling for a graphics processing scheme.

FIG. 6 is an action diagram of an embodiment of error handling for a graphics processing scheme. At 302 the application provides a first graphics command to the application level driver element. At 602 the application level driver provides a driver command to the kernel level driver. At 304 the kernel level driver provides a device command to the graphics subsystem. At 402 an error occurs in the graphics subsystem. At 404 the graphics subsystem provides an error indication to the kernel level driver. At 604 the kernel level driver provides an error indication to the application level driver. However, the application level driver does not report an error indication to the application.

Instead, at 606 the application level driver causes reconfiguration of the routing logic. The application has no indication that an error has occurred in the graphics processing, hence, at 308 the application provides a second graphics command to the application driver. Due to the reconfiguration of the routing logic, at 608 the application driver returns to the application without invoking command processing logic to carry out the second graphics command. In other words, the command processing logic corresponding to the second graphics command is stubbed out, and the application level driver returns processing to the application without an error indication or indication that the command processing was not carried out.

Thus, at 314 the application provides a third graphics command to the application level driver. At 610, due to the reconfiguration of the routing logic, the application level driver once again returns to the application without invoking the command processing logic. The application may continue to provide graphics commands to the application level driver, until such time that a graphics frame has been configured and is ready for display.

At 320 the application provides a display frame command to the application level driver and then at 326 provides a device status query to the application level driver. At 410 the application level driver provides to the application an indication of the error that took place earlier in the graphics processing. At 614 the application provides one or more commands to clear the error condition, and at 616 the application attempts to reconfigure the frame. Clearing the error condition may result in the application level driver reconfiguring the routing logic so that commands from the application once again invoke corresponding command processing logic elements of the application level driver.

Figure 7:
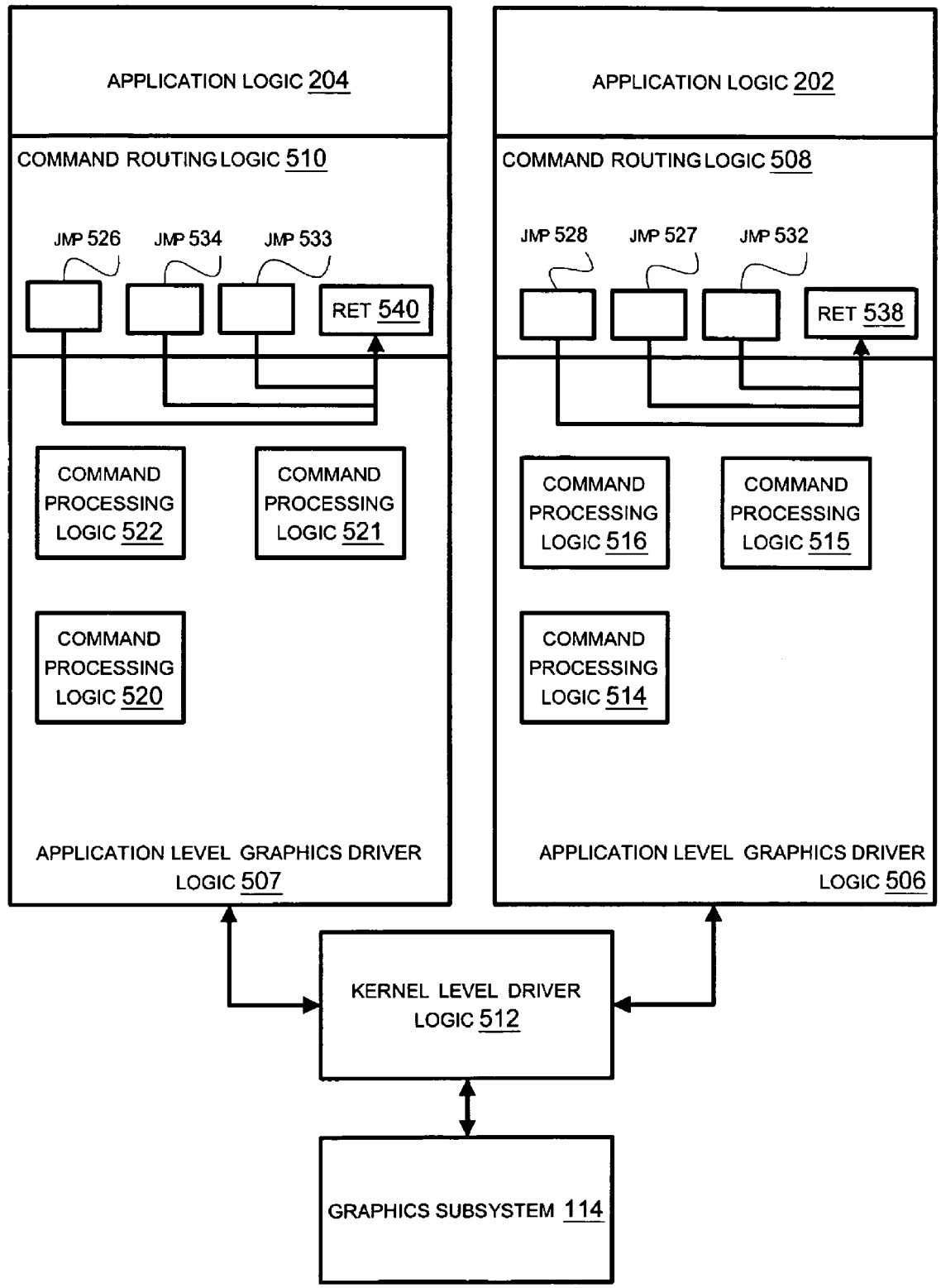
FIG. 7 is a block diagram of an embodiment of a logical arrangement for a graphics processing scheme in which an error condition has arisen.

FIG. 7 is a block diagram of an embodiment of a logical arrangement for a graphics processing scheme in which an error condition has arisen. The command routing logic 508 is configured to cause the jump logic 527, 528, and 532 to invoke the return logic 538 to cause commands from the application 202 to return without performing substantial processing and without providing the application 202 with an indication that the command was not processed and/or resulted in an error condition. In other words, the routing logic 508 "stubs out" the processing of the application level graphics driver logic 506. Likewise, the command routing logic 510 is configured so that the jump logic 526, 533, and 534 invokes the return logic 540, thus stubbing out processing by the application level graphics logic 207.

Figure 8:
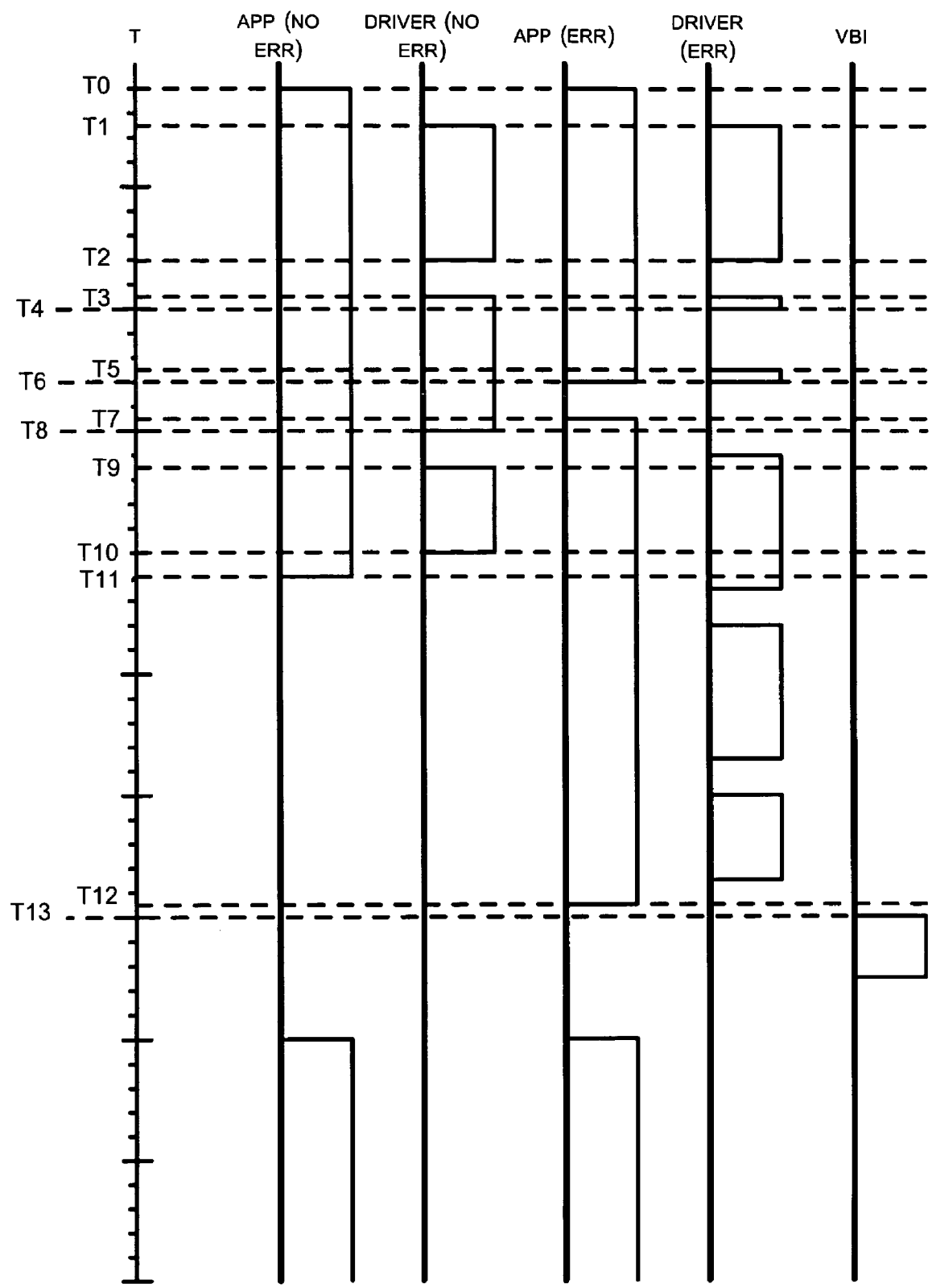
FIG. 8 is a timing diagram embodiment comparing application and driver processing times for normal and error conditions.

FIG. 8 is a timing diagram embodiment comparing application and driver processing times for normal and error conditions. At T0 the application begins processing to configure a graphics frame. The application invokes the application level driver to process three graphics commands (the number three selected merely as an example). The first command is processed from T1 to T2, the second from T3 to T8, and the third from T9 to T10. Due to the processing times of the driver, the application takes from T0 to T11 to configure a graphics frame.

If an error occurs during the configuration of the frame, there is not enough time before the VBI interval begins at T13 for the application to reconfigure and display the frame. Thus, a frame could be dropped or delayed, resulting in display inaccuracies.

If an error occurs in the processing of the first graphics command, the driver reconfigures the routing logic so that command processing time by the driver is substantially reduced. For example, the driver may stub out command processing, without providing the application with an indication of the error condition. Thus, driver processing in response to the second graphics command is substantially reduced to the interval T3-T4, and processing of the third graphics command is reduced to the interval T5-T6. Thus, in the presence of an error condition, the application processing time to configure a frame is reduced to the interval T0-T6. At or near T6 the application receives an indication of the error condition, and there is time enough between T7 and T12 to reconfigure the graphics frame before the VBI interval begins at T13.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A method comprising:
    as a result of detecting an error in a device driver command, reconfiguring command routing logic for device driver logic so that command processing logic of the device driver is not invoked and to return from the command in a manner indicative of successful completion of command processing.
2. The method of claim 1, further comprising:
    as a result of correction of the error, reconfiguring the command routing logic to invoke command processing logic of the driver logic in response to commands.

* * * * *